United States Patent [19]
Hieda

[11] Patent Number: 4,760,453
[45] Date of Patent: Jul. 26, 1988

[54] SOLID-STATE IMAGE PICKUP WITH MODE SELECTION TO CONTROL NOISE

[75] Inventor: Teruo Hieda, Yokohama, Japan

[73] Assignee: Canon Kabushiki Kaisha, Tokyo, Japan

[21] Appl. No.: 119,230

[22] Filed: Nov. 5, 1987

Related U.S. Application Data

[63] Continuation of Ser. No. 788,495, Oct. 17, 1985, abandoned.

[30] Foreign Application Priority Data

Oct. 22, 1984 [JP] Japan .................................. 59-221866

[51] Int. Cl.$^4$ ............................................... H04N 3/14
[52] U.S. Cl. ............................ 358/213.16; 358/221; 358/909; 358/213.15
[58] Field of Search ...................... 358/213.16, 213.19, 358/212, 211, 219, 221, 228, 163, 909, 213.15

[56] References Cited

U.S. PATENT DOCUMENTS

| | | | |
|---|---|---|---|
| 4,307,423 | 12/1981 | Atherton | 358/213 |
| 4,365,272 | 12/1982 | Nagai | 358/228 |
| 4,481,538 | 11/1984 | Battson et al. | 358/213 |
| 4,499,497 | 2/1985 | Levine | 358/211 |
| 4,507,684 | 3/1985 | Battson | 358/213 |
| 4,514,765 | 4/1985 | Miyata et al. | 358/213 |
| 4,587,563 | 5/1986 | Bendell et al. | 358/221 |

Primary Examiner—Jin F. Ng
Assistant Examiner—Stephen Brinich
Attorney, Agent, or Firm—Fitzpatrick, Cella, Harper & Scinto

[57] ABSTRACT

In a solid-state image pickup device having two modes, viz., the first accumulating mode, in which a variation of a dark current of each pixel of the solid-state image pickup device is large, and the second accumulating mode, in which a variation of a dark current is relatively small, when the dark current increases, the driving mode is switched to the second accumulating mode from the first accumulating mode.

27 Claims, 6 Drawing Sheets

SOLID-STATE IMAGE PICKUP WITH MODE SELECTION TO CONTROL NOISE

This application is continuation of application Ser. No. 788,495 filed Oct. 17, 1985, now abandoned.

BACKGROUND OF THE INVENTION

1. Field of the Invention

The present invention relates to a television camera apparatus using a solid-state image pickup device having a potential well and, more particularly, to a solid-state image pickup apparatus which can prevent deterioration of an image quality.

2. Description of the Prior Art

In the case where a television camera apparatus using a charge coupled device (CCD) is used under circumstances in which a dark current increases, such as, for example, under high temperature conditions, a picture quality can deteriorate greatly due to both such an increase in the dark current and an increase in variation of the dark current for every pixel, which is caused by the difference of the characteristics of respective pixels constituting the solid-state image pickup device, and at the same time the S/N ratios of luminance and chrominance are degraded to considerable degree.

Such deterioration will be described with regard to an example of the solid-state image pickup device which is operated by way of a single phase driving system, with reference to FIGS. 1 to 5.

FIG. 1 is a diagrammatical view of one pixel of a solid-state image pickup device. FIG. 2 is a waveform diagram of driving voltages for driving the solid-state image pickup device in the interlacing mode or non-interlacing mode. FIG. 3 is a diagram showing the states of the potential wells of virtual phase shift sections 4 and 4' and of a driving phase shift section 3 in one pixel when a middle voltage $V_M$ is applied to a transfer electrode of the solid-state image pickup device. In the virtual phase shift sections 4 and 4', the potential wells are set to a plurality of potential levels in a stepwise manner by changing the concentration of P ions. FIG. 4 is a diagram showing the states of the potential wells of the virtual phase shift sections 4 and 4' and of the driving phase shift section 3 in each pixel when a driving voltage $V_0$ is applied to the transfer electrode of the solid-state image pickup device. FIG. 5 is a diagram showing an increase in dark current for a change in temperature of the solid-state image pickup device.

In FIG. 1, reference numeral 1 denotes a semiconductor substrate consisting of P-type silicon or the like; 2 is a transfer electrode consisting of transparent polysilicone having conductivity or the like; 2' is a lead connected to a drive circuit for driving the solid-state image pickup device; 3 a driving phase shift section; 4 and 4' virtual phase shift sections; 5 a silicon oxide film having an insulating property; and 6 a shielding layer. In the diagram, a dope portion of n ions is indicated by a mark (+) and a dope portion of p ions is represented by a mark (−) in the shielding layer 6.

The dope portion of p ions existing near the surface of the virtual phase shift portion 4 is connected to a channel stopper (not shown), so that the surface potential is fixed to the potential of the semiconductor substrate 1. The surface of the driving phase shift portion 3 faces the transfer electrode 2 through the silicon oxide film 5. The voltage $V_1 = K_1 V_D + K_2 V_{SUB}$ which is derived by dividing and adding a transfer electrode voltage $V_D$ and a voltage $V_{SUB}$ of the substrate 1 is applied to the surface of the driving phase shift portion 3, wherein $K_1$ and $K_2$ potential constants which are determined by the thicknesses and dielectric constants of the film 5 and substrate 1.

FIG. 2 shows signal waveforms of the driving voltages for making the virtual phase shift portion 4 operative. In the diagram, the signal charges generated in correspondence to a quantity of light of an object to be photographed which enters the photo sensitive portion of the solid-state image pickup device are accumulated for an accumulation period of time indicated at $t_1$. The signal charges are transferred to the accumulating portion of the solid-state image pickup device for a transfer period of time $t_2$. The middle voltage $V_M$ is applied to the transfer electrode 2 to make the solid-state image pickup device operative in the interlacing mode. The driving voltage $V_0$ is applied to the transfer electrode 2 to make the solid-state image pickup device operative in the non-interlacing mode. Reference characters A and B represent voltage levels in operation in the interlacing mode and non-interlacing mode, respectively.

The interlacing mode in which the signal charges of each pixel are taken out by performing the interlacing scanning will be described with reference to FIGS. 3 and 2.

As shown in FIG. 2, the driving voltage $V_D$ which is applied to the transfer electrode 2 is maintained to the middle voltage $V_M$ for the accumulation period $t_1$ in the interlacing mode. In this case, as shown in FIG. 3, the potentials 7 of the virtual phase shift portion 4 and of the driving phase shift portion 3 are the same level, so that the photoelectrons e generated by the incident light $\nu$ are accumulated in wells 8 in the virtual phase shift portion 4 and driving phase shift portion 3 by the same quantity, respectively.

As shown in FIG. 2, for the transfer period $t_2$, the level of the first driving voltage which is applied to the transfer electrode at the start of the transfer period $t_2$ is switched in dependence on the odd field (Odd) and even field (Even). Namely, as shown in FIG. 2, the potential is dropped at the start of the transfer of the signal charges in the odd field and the potential is raised in the odd field. Due to such increase and decrease in the potential, as shown in FIG. 3, in the odd field, the signal charges accumulated in the well 8 of the driving phase shift portion 3 are added in the well 8 of the virtual phase shift portion 4' to the signal charges accumulated in the well 8 of the portion 4'. Thus, the center of sensitivity exists at the middle position between the portions 3 and 4'. In the even field, the signal charges accumulated in the virtual phase shift portion 4 are added in the driving phase shift portion 3 to the signal charges accumulated in the portion 3. Thus, the center of sensitivity exists at the middle position between the portions 3 and 4'. Then, the pulse driving voltage having the levels of the zero potential and of the driving voltage $V_0$ as shown in FIG. 2 is applied to the transfer electrode 2, thereby transferring the signal charges accumulated in each well 8.

The non-interlacing mode in which the interlacing scanning is not carried out will now be described with reference to FIGS. 4 and 2.

As shown in FIG. 2, the driving voltage which is applied to the transfer electrode 2 is maintained to the driving voltage $V_0$ for the accumulation period $t_1$ in the non-interlacing mode. In this state, potentials 7 and 7' of the driving phase shift portion 3 and of the virtual phase shift portions 4 and 4' differ. Therefore, all of the photoelectrons e generated by the incident light ν are collected to the portions 4 and 4' and the signal charges accumulated therein are transferred by applying to the transfer electrode 2 the pulse driving voltage having the levels of the zero voltage and of the voltage $V_0$ as shown in FIG. 2.

As described above, the solid-state image pickup device can perform any operation in the interlacing mode or non-interlacing mode in correspondence to the level of the voltage applied to the transfer electrode 2.

Referring now to FIG. 3 showing the operation in the interlacing mode and FIG. 4 showing the operation in the non-interlacing mode, the potential distributions 7 and 7' near the surface of the driving phase shift portion 3 and the states near the surface thereof differ as indicated by the presence and absence of the wells 8. Practically speaking, as shown in FIG. 3, when the voltage of the middle level $V_M$ is applied, the portion near the surface of the driving phase shift portion 3 becomes the depletion portion. However, when the voltage $V_0$ is applied, as shown in FIG. 4, the portion near the surface is filled with holes indicated by a mark (X). Namely, this is because the driving voltage $V_0$ applied to the transfer electrode 2 exceeds the pinch-off voltage, so that the holes are implanted into the portion near the surface of the driving phase shift portion 3 from a channel stopper (not shown) and its potential is held to zero.

Therefore, the magnitudes of the dark currents produced due to generation of the electron-hole pairs due to thermal excitation differ in the interlacing mode and non-interlacing mode. Namely, thermoelectrons generated in the portion near the semiconductor substrate 1, which becomes a main cause of an increase in dark current, are combined with the holes existing near the surface of the driving phase shift portion 3 in the non-interlacing mode. Thus, only the thermoelectrons generated in the wells of the dark current are accumulated in the wells.

On the contrary, in the interlacing mode, since no holes exist in the portion near the surface of the driving phase shift portion 3 in FIG. 3 as mentioned above, the thermoelectrons generated in the portion near the surface also enter the wells and the dark current increases largely. Such an increase in dark current results in increase in variation of the dark current.

The dark current which increases in response to a change in temperature of the solid-state image pickup device will then be described with reference to FIG. 5.

In FIG. 5, the abscissa indicates the driving voltage V applied to the transfer electrode and the ordinate represents the dark current and reference characters $T_0$, $T_1$ and $T_2$ show temperatures of the solid-state image pickup device. There is the relation of $T_0 < T_1 < T_2$ among those temperatures. When the driving voltage $V_D$ shown in FIG. 2 is lower than the pinch-off voltage $V_P$ example, when the driving voltage is $V_0$), the holes are implanted into the portion near the surface of the driving phase shift portion 3 as mentioned above, so that the dark current is very small. However, when a driving voltage is larger than the pinch-off voltage $V_P$ (e.g., when the voltage $V_M$ is applied), the dark current increases. Further, the dark current increases more and more with an increase in temperature. On one hand, this dark current also increases depending on the accumulation period of time.

As described above, the solid-state image pickup device can perform both operations in the interlacing and non-interlacing modes in dependence on the difference in driving voltage applied to the transfer electrode. However, in the case of executing the operation in the interlacing mode, the dark current increases and the variation of the dark current becomes large as compared with those in the operation in the non-interlacing mode.

Therefore, in particular, when the interlacing operation is carried out or when the temperature of the solid-state image pickup device is high and the accumulation time is long, the black level of the video signal fluctuates due to the increase in the dark current and the variation of the dark current. Thus, the balance of black on the screen becomes unbalanced and the picture quality deteriorates.

SUMMARY OF THE INVENTION

It is the first object of the present invention to solve the foregoing drawbacks of the conventional technology.

The second object of the invention is to obtain a good picture quality by controlling the driving condition of a solid-state image pickup device in the case where a dark current of this device increases under the first object.

The third object of the invention is to obtain a good picture quality in which even when a temperature of a solid-state image pickup device becomes high, the driving condition of this device is controlled and thereby to prevent a variation in a dark current.

The fourth object of the invention is to obtain a further good picture quality by interpolating and correcting an output of a video signal taken out from a solid-state image pickup device by way of a circuit.

The fifth object of the invention is to obtain a good picture quality while solving deterioration of the picture quality due to an increase in gain upon photographing when an illuminance is low.

According to the present invention, the foregoing objects are attained by provision of a solid state image pickup device having image sensing means comprising a plurality of pixels formed by potential welds each of which has first and second states, means for detecting an increase in dark current of the sensing means, and means for switching between the first and second states in accordance with the result of detection by the detecting means. The two states differ specifically in the dark current, or variation thereof, occurring in the state, the first state being one in which the dark current variation is greater than that in the second. The detecting means may also detect temperature. These arrangements provide high quality image pickup without excessive degradation resulting from variations in dark current and similar problems.

The foregoing and other objects, features and advantages of the invention will be more fully appreciated from a consideration of the following detailed description of the preferred embodiments, in which like reference characters refer to like elements throughout.

BRIEF DESCRIPTION OF DRAWINGS

FIGS. 1 to 5 are diagrams for explaining the operation to drive a solid-state image pickup device of a conventional apparatus, in which, FIG. 1 is a diagrammatical view of one pixel of the solid-state image pickup device;

FIG. 2 is a waveform diagram illustrating driving in the interlacing mode and driving in the non-interlacing mode;

FIG. 3 is a diagram showing the states of the potential distribution and wells in one pixel upon driving in the interlacing mode;

FIG. 4 is a diagram showing the states of the potential distribution and wells in one pixel upon driving in the non-interlacing mode; and FIG. 5 is a diagram showing the relation between the temperature and the dark current of the solid-state image pickup device.

FIGS. 6 to 11 show embodiments according to the present invention, in which

FIG. 6 is a block diagram of a first embodiment of the invention;

FIG. 7 is a block diagram showing in detail an arrangement of the main part of what is shown in FIG. 6;

FIGS. 8 and 9 are time charts for explaining the operation of the block shown in FIG. 7;

FIG. 10 is a block diagram of a second embodiment of the invention; and

FIG. 11 is a block diagram of a third embodiment of the invention.

DETAILED DESCRIPTION OF THE PREFERRED EMBODIMENTS

The means taken in the present invention of this application to accomplish the foregoing objects will be shown and described as examples hereinbelow.

Figure 6:
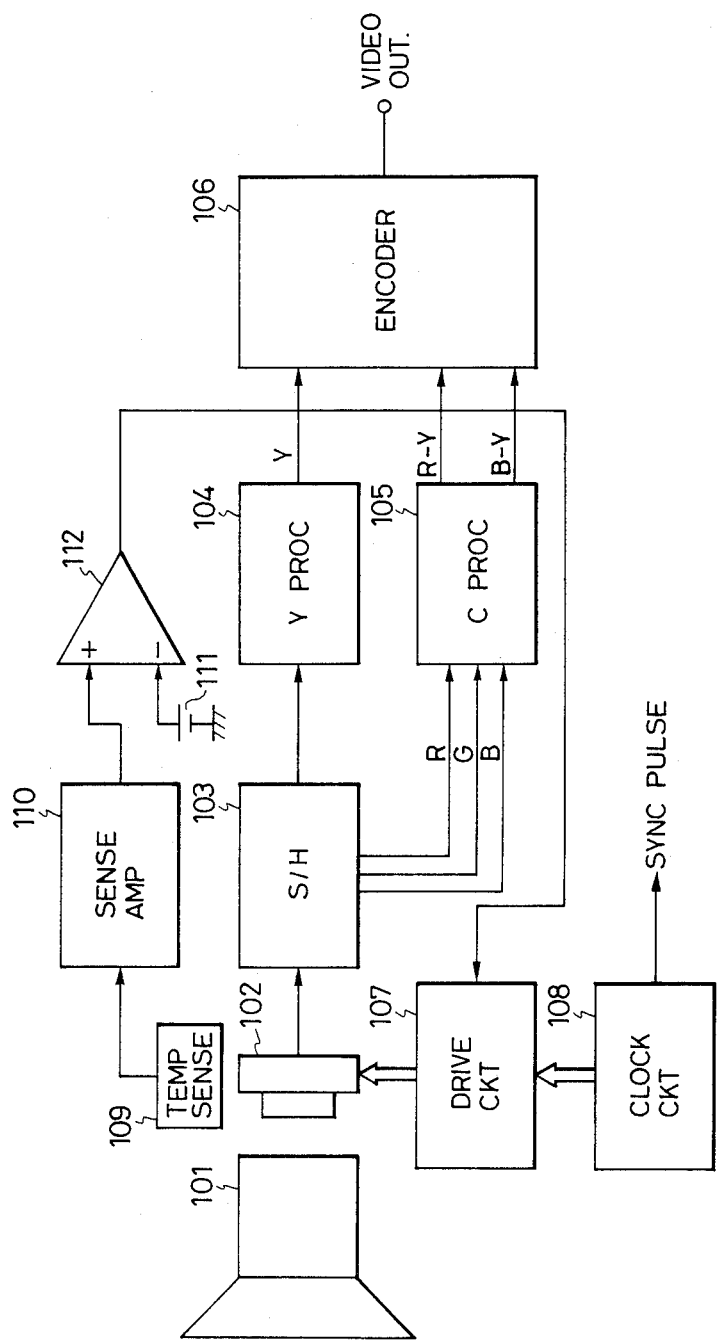

FIG. 6 is a block diagram of a first embodiment of the present invention.

In FIG. 6, an optical system 101 includes a focusing lens, a zoom lens, a compensator lens, a relay lens, and an optical filter. A solid-state image pickup device 102 of, for example, the frame transfer system includes a photo sensitive portion, an accumulating portion, a transfer register, and a readout register (which are not shown). A sample and hold circuit 103 receives signal charges taken out from the device 102 and separates them into a luminance signal Y through a low-pass filter (not shown) and chrominance signals of R (red), G (green) and B (blue) through a band-pass filter (not shown) and then outputs those signals. A luminance signal processing circuit 104 performs the clamping correction, gamma correction and the like for the luminance signal Y outputted from the sample and hold circuit 103. A chrominance signal processing circuit 105 receives the chrominance signals R, G and B outputted from the sample and hold circuit 103 and performs the clamping correction, gamma correction and the like and outputs color difference signals R-Y and B-Y. An encoder 106 receives the luminance signal Y outputted from the luminance signal processing circuit 104 and the color difference signals R-Y and B-Y outputted from the chrominance signal processing circuit 105 and synthesizes these signals and then outputs a video signal of, e.g., the NTSC system.

A drive circuit 107 serves as second means for controlling the potential well states of the solid-state image pickup device 102. This drive circuit drives the device 102 to transfer the signal charges accumulated in the photo sensitive portion of the device 102 to the accumulating portion and output them to the outside. Although not shown, the drive circuit 107 includes therein: a driving circuit for making the device 102 operative in the interlacing mode; a driving circuit for making the device 102 operative in the non-interlacing mode; a gate switch for connecting the interlacing mode driving circuit to the device 102 when a "0" signal is outputted from a comparator 112, which will be explained hereinbelow, namely, when the temperature of the device 102 does not exceed a predetermined value; and a gate switch for connecting the non-interlacing mode driving circuit to the device 102 in response to a "1" signal of the comparator 112 which is outputted when the temperature of the device 102 exceeds the predetermined value. A clock circuit 108 generates a synchronous pulse and a clock signal for allowing the drive circuit 107 and other circuit system (not shown) to execute the synchronous processes.

A temperature sensor 109 such as a thermistor or the like detects the ambient temperature of the device 102 and is arranged at a location near the device 102. A sense amplifier 110 amplifies a temperature detection signal from the sensor 109. A comparator 112 compares the temperature of the device 102 with a predetermined value and determines whether it exceeds the predetermined value. A reference voltage source 111 generates a reference voltage. The set value of the reference voltage is determined to a value corresponding to the temperature of the device at which when the dark current increases with an increase in ambient temperature of the device 102, the total number of defects shown due to the reduction of the S/N ratios of luminance and chrominance becomes equal to the number of defects representing flicker of the screen in the operation in the non-interlacing mode. A "1" signal is outputted when the temperature of the device 102 becomes high and a detection signal of the temperature sensor 109 is inputted through the sense amplifier 110 to a non-inverting input terminal of the comparator 112 and exceeds the reference voltage value of the reference voltage source 111. On the contrary, when the detection signal of the temperature sensor 109 does not exceed the reference voltage value of the reference voltage source 111, a "0" signal is outputted. This "1" or "0" signal is inputted to the drive circuit 107. The sensor 109 and the comparator 112 having the voltage source 111 constitute the first means for detecting an increase in the dark current of the solid-state image pickup device 102.

The operation of the apparatus of the first embodiment of the invention will now be described.

Figure 5:
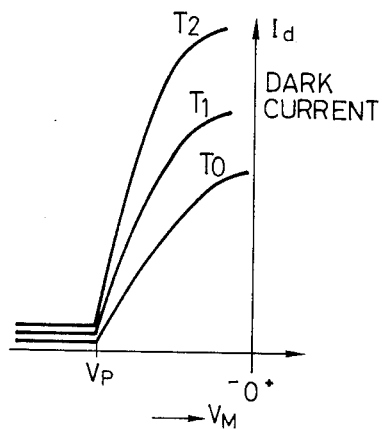

It is now assumed that the temperature detection signal level of the device 102 is lower than the reference voltage value of the voltage source 111. An object image is formed through the optical system 101 on the device 102 and the signal charges corresponding to the quantity of light of the object image are accumulated in the photo sensitive portion. Since the temperature detection signal level of the device 102 is lower than the reference voltage value of the voltage source 111, the "0" signal outputted from the comparator 112 is inputted to the drive circuit 107. In the drive circuit 107, the driving circuit for making the device 102 operative in the interlacing mode is operated in response to the "0" signal. Therefore, the drive circuit 107 applies the middle voltage $V_M$ to the transfer electrode of each pixel of the device 102 for the accumulation period $t_1$ as shown in FIG. 5; applies the driving pulse to the transfer electrode for the transfer period $t_2$; transfers the signal charges accumulated for every odd field and even field; and supplies the signal charges as a video signal to the sample and hold circuit 103. The sample and hold circuit 103 separates the video signal into the luminance signal Y through the low-pass filter and the chrominance signals R, G and B through the band-pass filter. The circuit 103 then supplies the luminance signal Y to the luminance signal processing circuit 104 and the chrominance signals R, G and B to the chrominance signal processing circuit 105, respectively. The processing circuit 104 performs the processes of the clamping correction, gammer correction and the like for the inputted luminance signal Y and then transmits to the encoder 106. On one hand, the processing circuit 105 carries out the processes of the clamping correction, gamma correction and the like for the chrominance signals R, G and B inputted in a similar manner and thereby to further form the color difference signals R-Y and B-Y. These color difference signals are transmitted to the encoder 106. The encoder 106 synthesizes the luminance signal Y and color difference signals R-Y and B-Y and forms the video signal of, e.g., the NTSC system and outputs this video signal.

When the temperature of the device 102 becomes high in such a state as mentioned above, the detection signal of the temperature sensor 109 is inputted to the non-inverting input terminal of the comparator 112 through the sense amplifier 110 and exceeds the reference voltage value of the reference voltage source 111 inputted to an inverting input terminal, so that the "1" signal is outputted from the comparator 112 and inputted to the drive circuit 107.

Figure 3:
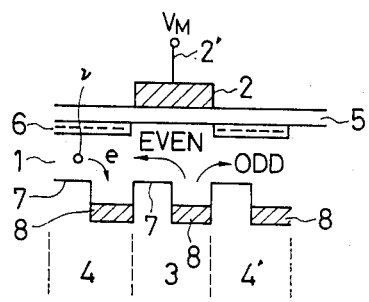

Thus, the non-interlacing mode driving circuit in the drive circuit 107 is operated. As shown in FIG. 3, the drive circuit 107 applies the negative driving voltage $V_0$ to the transfer elecrrode 2 of the device 102 and accumulates the signal charges for the accumulation period $t_1$. For the transfer period $t_2$, the drive circuit 107 transfers the signal charges accumulated by supplying a driving pulse from time $t_2'$ and takes out them to the outside.

In this way, when the temperature of the image pickup device 102 becomes high, the driving mode of the device 102 is switched from the interlacing mode to the non-interlacing mode and an image of a good picture quality can be formed without being influenced by the increase in the dark current.

The drive circuit 107, clock circuit 108, temperature sensor 109, sense amplifier 110, and comparator 112 which operate in the manner as described above will then be described with reference to FIG. 7.

Figure 7:
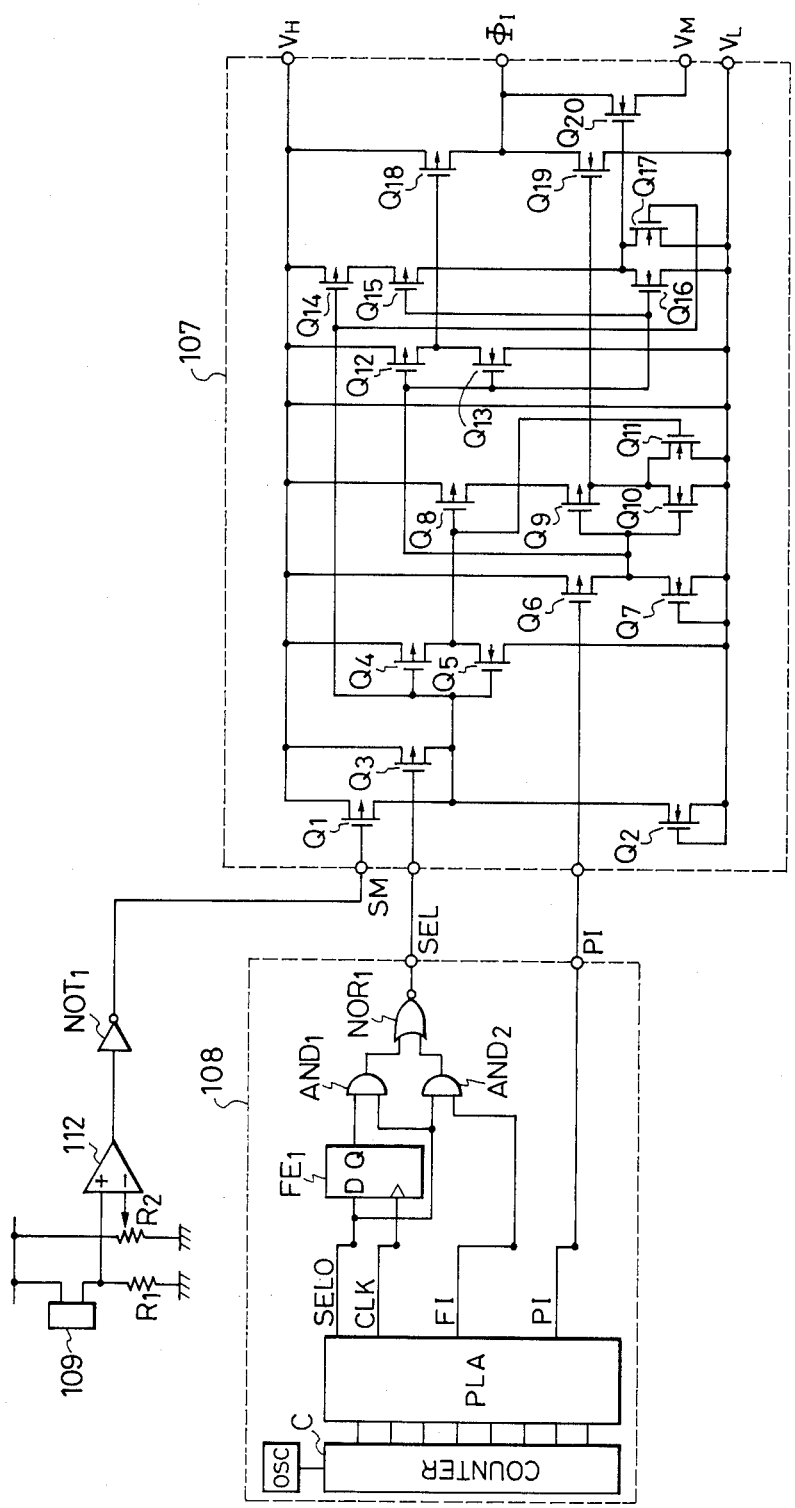
Figure 8:
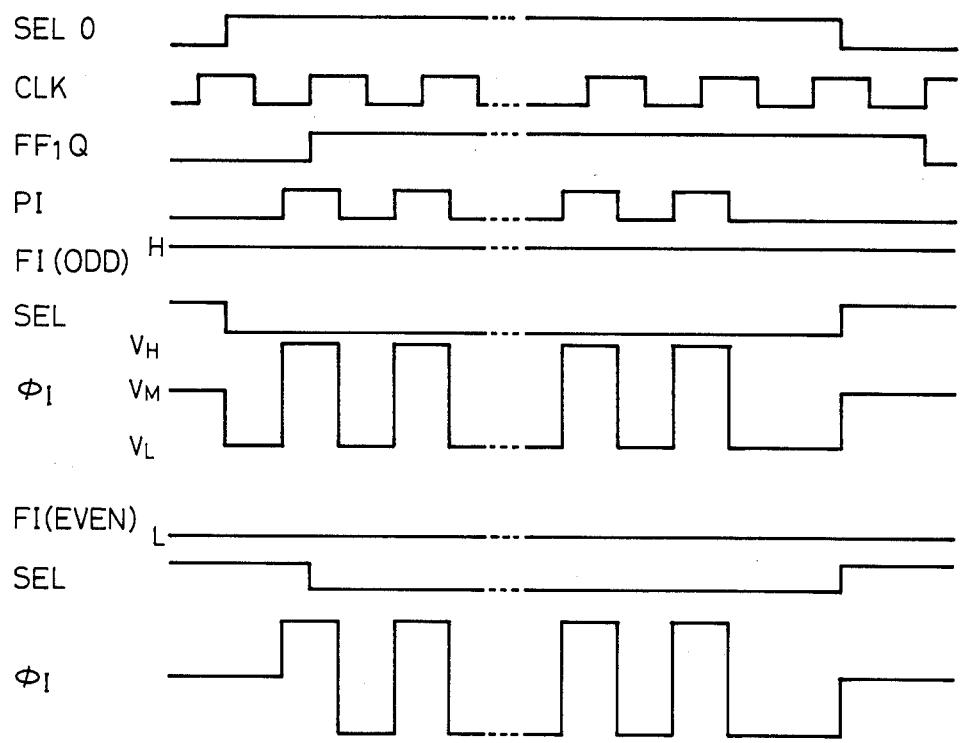

FIG. 7 is a block diagram showing the main part of the image pickup apparatus shown in FIG. 6, in which the parts and components having the same functions as those of the parts and components shown in FIG. 6 are designated by the same reference numerals and their detailed descriptions are omitted. In this embodiment, as mentioned above, the frame transfer type image pickup device is used and the output of the comparator 112 changes from an "L" level to an "H" level when the temperature of the device 102 increases in excess of a predetermined value. The output of the comparator 112 is inverted by an inverter $NOT_1$ and inputted to an SM input terminal of the drive circuit 107. On one hand, a level switching signal SEL of the driving voltage of the image pickup portion and a vertical transfer pulse PI from the image pickup portion of the image pickup device of the frame transfer type to the storage portion are inputted from the clock circuit 108 to the drive circuit 107. Namely, reference character $SEL_0$ denotes an original signal of the level switching signal SEL. The signal SEL is synthesized from the signal $SEL_0$ by way of a delay circuit consisting of $FF_1$ and a change-over circuit consisting of $AND_1$, $AND_2$ and $NOR_1$. A discriminating signal FI is used to discriminate the field to see if it is the odd field or even field and serves to switch the signal SEL through an $AND_2$. The pulse signal PI is used to determine the timing for vertical transfer. A vertical driving signal $\phi_I$ of the image pickup portion is supplied to the transfer electrode 2 shown in FIGS. 1, 3 and 4. Reference characters $Q_1$ to $Q_{20}$ in the drive circuit 107 denote FETs. The signals $SEL_0$, CLK, FI, and PI are generated by way of an 8-bit counter C, a PLA (programmable logic array), and a clock generator OSC as shown in time chart of FIG. 8.

The operation of the circuit of the block diagram shown in FIG. 7 will then be explained. In the circuit shown in FIG. 7, the relation between the trailing edge of the signal SEL and the state at the start of supply of the vertical driving signal $\phi_I$ of the image pickup portion is switched in accordance with the odd field or even field when the interlacing operation is being performed. That is, when the temperature of the device 102 is lower than a predetermined value, the output of the comparator 112 is at an L level, so that it is inverted by the $NOT_1$ and this H-level signal is inputted to an SM input terminal.

In order to accomplish the foregoing objects, a following preferred embodiments may be provided according to the present invention; that is, a solid-state image pickup device comprising image sensing means having a plurality of pixels formed by potential wells, means for controlling state of said image sensing means, said control means having a first mode for controlling said potential wells so that they are in a first state and a second mode for controlling said potential wells so that dark current which occurs in the potential wells is smaller than that of the first mode, detecting means for detecting an increase in the dark current of said sensing means, and switching means for switching between said first and second modes of said control means in accordance with the result of the detection of said detecting means. This feature provides control of potential well according to dark current. In this case, in accordance with the H level and the L level of the level switching signal SEL, the signals of the inverted L level and H level of the signal SEL are inputted to the gates of the transistors $Q_4$ and $Q_5$, respectively.

Therefore, when the signal SEL is at an H level, $Q_{14}$ is turned on, $Q_{17}$ is turned off, $Q_8$ is turned off, $Q_{11}$ is turned on, and $Q_{19}$ is turned off, and the signal PI is supplied to $Q_{18}$ and $Q_{20}$. Namely, when the signal PI is at an H level, a voltage $V_H$ is outputted as the vertical driving signal $\phi_I$. When the signal PI is at an L level, the voltage $V_M$ is outputted. Therefore, in this case, $V_L$ is not outputted as the vertical driving signal $\phi_I$. On the contrary, when the signal SEL is at an L level, $Q_{14}$ is OFF, $Q_{17}$ is ON, $Q_8$ is ON, $Q_{11}$ is OFF, and $Q_{20}$ is OFF, and the signal PI is supplied to $Q_{18}$ and $Q_{19}$. That is, when the signal PI is at an H level, $V_H$ is outputted as the signal $\phi_I$. When the signal PI is at an L level, $V_L$ is outputted as the signal $\phi_I$. In this case, therefore, the vertical driving signal $\phi_I$ does not become $V_M$.

Figure 4:
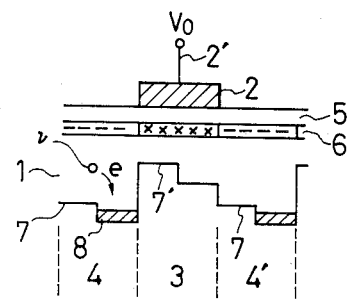
Figure 9:
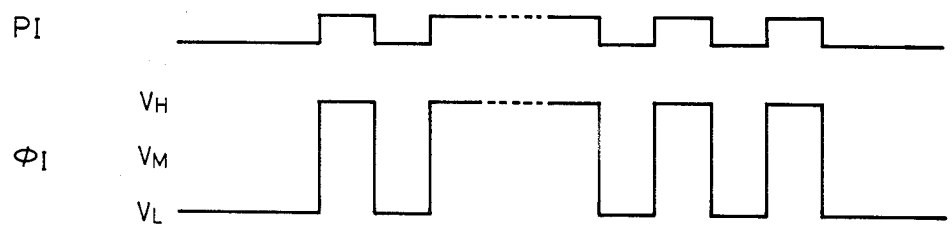

Next, the operation when the temperature of the image pickup device 102 is higher than the predetermined value, namely, when the output of the comparator 112 is at an H level will be described with reference to FIG. 9. In such a case, the L-level signal is inputted to the terminal SM and $Q_1$ is turned on, so that the gates of the transistors $Q_4$ and $Q_5$ are always held at an H level irrespective of the input of the signal SEL. Thus, $Q_{14}$ is OFF, $Q_{17}$ is ON, $Q_8$ is ON, $Q_{11}$ is OFF, and $Q_{20}$ is OFF, and the voltages $V_H$ and $V_L$ are alternately outputted as the vertical driving signal $\phi_I$ in accordance with the H level and the L level of the signal PI. Consequently, when the signal PI is at an L level, that is, when the signal charges are being accumulated in the image pickup portion of the device 102, the signal $\phi_I$ becomes an L level, namely, the potential well of the image pickup portion becomes the state as shown in FIG. 4. The dark current generated in the portion near the surface of the driving phase shift portion 3 is trapped by the holes and decreases.

Consequently, according to this embodiment, when the temperature of the solid-state image pickup device 102 increases, the device 102 operates in the non-interlacing mode, so that the dark current generated in the interlacing mode due to the holes existing in the portion near the surface of the driving phase shift portion 3 shown in FIG. 4 can be removed and the occurrence of the variation of the black level of the video signal is prevented. Thus, an image of a good picture quality can be obtained.

The second embodiment of the present invention will be described with reference to the block diagram of FIG. 10.

Figure 10:
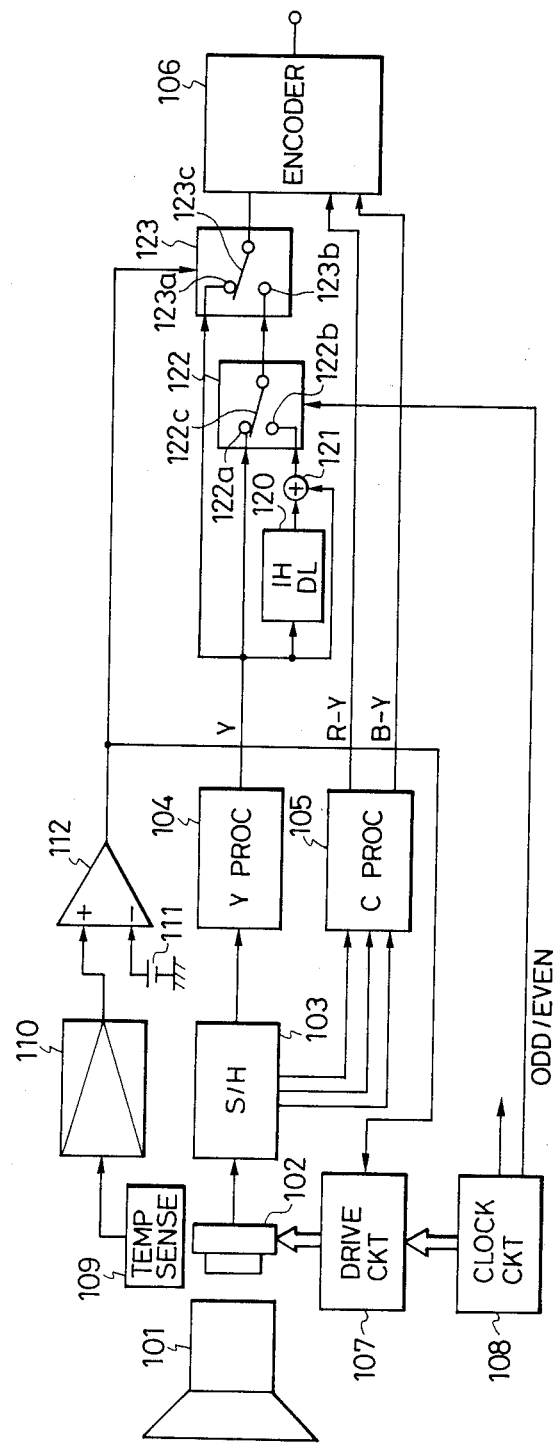

In FIG. 10, the same parts and components as those shown in FIG. 6 are designated by the same reference numerals and their detailed descriptions are omitted together with the descriptions of their operations.

In FIG. 10, reference numeral 120 denotes a 1H delay line to delay the luminance signal outputted from the luminance signal processing circuit 104 by one horizontal period. An adder 121 adds the luminance signal directly outputted from the processing circuit 104 and the luminance signal outputted from the 1H delay line 120 and forms the even field in the operation in the non-interlacing mode and then outputs it. A field change-over switch 122 comprises a change-over contact member 122c, a fixed contact 122a connected to the output side of the processing circuit 104, and a fixed contact 122b connected to the adder 121. In response to the signal from the clock circuit 108, the change-over contact member 122c is connected to the fixed contact 122a in the case of the odd field and to the fixed contact 122b in the case of the even field. An interpolation change-over switch 123 comprises a change-over contact member 123c, a fixed contact 123a connected to the output side of the processing circuit 104 and a fixed contact 123b connected to the output side of the contact member 122c of the switch 122. The contact member 123c is connected to the fixed contact 123a when the "0" signal is outputted from the comparator 112 and to the fixed contact 123b when the "1" signal is outputted. The 1H delay line 120, adder 121, field change-over switch 122, and interpolation change-over switch 123 constitute the means for making the solid-state image pickup device 102 operative in the non-interlacing mode and performing the signal process by way of a circuit so as to produce the even field signal from the odd field signal outputted and thereby executing the interpolating process in accordance with a change in the output characteristic of the solid-state image pickup device, as will be apparent from the description hereinafter.

The operation of the apparatus of the second embodiment of the invention will now be described.

When the temperature detection signal level of the device 102 is lower than the reference voltage value of the reference voltage source 111, the "0" signal is outputted from the comparator 112 and inputted to the interpolation switch 123 and drive circuit 107. In this case, when the interlacing mode driving circuit in the drive circuit 107 is operated, the device 102 is operated in the interlacing mode and the contact member 123c of the switch 123 is connected to the fixed contact 123a. When the even field signal, namely, the L-level FI signal shown in FIG. 7 mentioned before is supplied from the clock circuit 108, the contact member 122c is connected to the fixed contact 122b. When the odd field signal, i.e., the H-level FI signal shown in FIG. 7 is supplied, the contact member 122c is connected to the fixed contact 122a. In this manner, the contact member 122c is alternately connected to the fixed contact 122b or 122a in response to the L-level or H-level FI signal. However, since the contact member 123c of the switch 123 is held connected to the fixed contact 123a, the luminance signals of the odd and even fields outputted from the processing circuit 104 are transmitted to the encoder 106 through the fixed contact 123a and contact member 123c.

When the temperature of the device 102 becomes high and the detection signal from the temperature sensor 109 is inputted to the non-inverting input terminal of the comparator 112 and exceeds the reference voltage value of the reference voltage source 111 applied to the inverting input terminal, the "1" signal is outputted from the comparator 112 and inputted to the drive circuit 107 and interpolation switch 123. Thus, the non-interlacing mode driving circuit in the drive circuit 107 is made operative and the device 102 is driven in the non-interlacing mode, and at the same time the contact member 123c of the switch 123 is connected to the fixed contact 123b. Therefore, the luminance signal Y outputted from the processing circuit 104 is directly inputted to the encoder 106 since the contact member 122c is connected to the fixed contact 122a when the odd field signal is inputted to the field change-over switch 122 from the clock circuit 108. In response to the signal inputted to the field change-over switch 122 from the clock circuit 108, the change-over contact member 122c is connected to the fixed contact 122b in the even field. Thus, the luminance signal outputted from the processing circuit 104 is added by the adder 121 to the luminance signal delayed by one horizontal line from the 1H delay line 120. This added luminance signal is inputted to the encoder 106 through the fixed contact 122b, contact member 122c, fixed contact 123b, and contact member 123c.

In the embodiment shown in FIG. 6, the signal of the same line is read out in any of the odd and even fields in the non-interlacing mode, so that the image reproduced in the interlacing mode flickers. On the other hand, according to the second embodiment, although the signal is read out in a manner similar to FIG. 6 in the case of the odd field, the signal delayed by one horizontal line is added by the adder 121 in the case of the even field, so that the signal which is slightly different from that of the odd field can be outputted.

In this manner, even in the case where the non-interlacing mode is set to prevent degradation of the picture quality when the dark current increases under the high temperature condition of the device 102 as well, the flickering of the image due to the operation in the non-interlacing mode which is caused in the embodiment shown in FIG. 6 is prevented and the image of a good picture quality can be provided.

The third embodiment of the invention will then be described with reference to a block diagram of FIG. 11.

Figure 11:
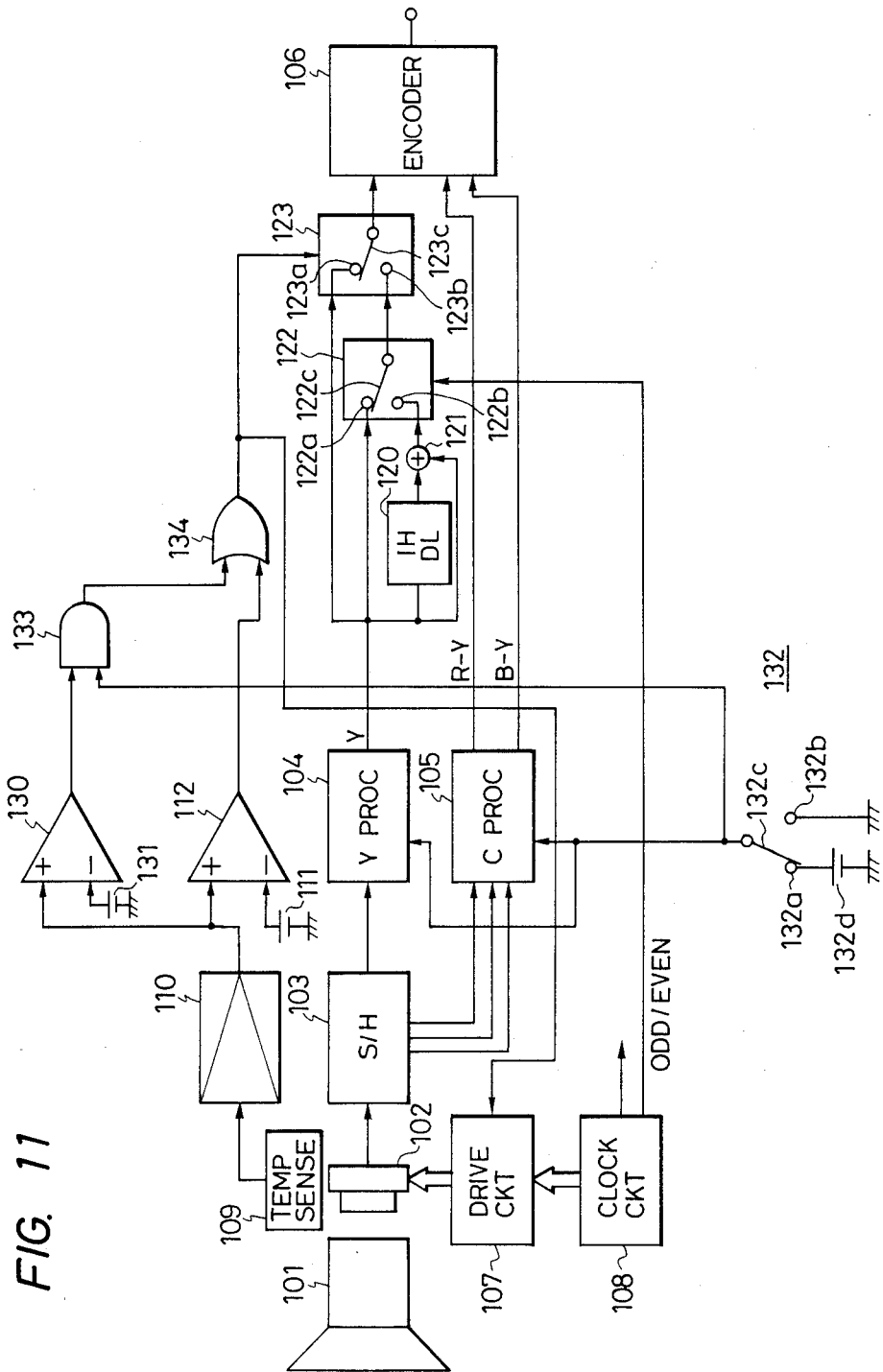

In FIG. 11, the same parts and components as those shown in FIGS. 6 and 10 are designated by the same reference numerals and their detailed descriptions are omitted together with the descriptions of their operations.

In FIG. 11, a second comparator 130 is connected to the output side of the sense amplifier 110 in parallel with the first comparator 112. A noninverting input terminal of the comparator 130 is connected to the output side of the amplifier 110 and an inverting input terminal is connected to a reference voltage source 131 having a value smaller than the reference voltage value of the reference voltage source 111 of the comparator 112. The comparator 130 outputs a "0" signal when the detection signal level of the temperature sensor 109 does not exceed the reference voltage value of the voltage source 131 and a "1" signal when it exceeds the reference voltage value.

A gain-up switch 132 is used to increase the gains of the processing circuits 104 and 105 in the case of photographing a dark object. This switch comprises a change-over contact member 132c, a fixed contact 132b connected directly to the earth and serving to form a low-level signal for making the signal processing circuits 104 and 105 operative in the normal mode, and a fixed contact 132a and a power source 132d to form a high-level gain-up signal. The output side of the contact member 132c is connected to the processing circuits 104 and 105 and to an AND gate 133 connected to the output side of the comparator 130. The gain-up switch 132 may be manually driven or may be automatically driven in the gain-up mode when the output level of the device 102 is low and in the normal mode when it is high as will be explained hereinlater. The output sides of the AND gate 133 and of the comparator 112 are connected to an OR gate 134. The output side of the OR gate 134 is connected to the switch 123 and drive circuit 107. The deterioration of the picture quality which is caused in the case where a dark object is photographed using the solid-state image pickup device 102 is eliminated by driving the device 102 in the non-interlacing mode by way of the means composed of the comparator 130 having the reference voltage source 131, AND gate 133, OR gate 134, and gain-up switch 132.

The operation of the apparatus of the third embodiment of the invention will now be described.

The contact member 132c of the gain up switch 132 is connected to the fixed contact 132b in the normal mode, so that the "0" signal is inputted to the AND gate 133 and a low-level signal is outputted from the AND gate 133. Thus, the level of the detection signal of the temperature sensor 109 exceeds the reference voltage value of the voltage source 131 of the comparator 130. Even when the comparator 130 outputs the "1" signal, the "0" signal is still outputted from the AND gate 133. Therefore, when the "0" signal is inputted from the comparator 112 to the OR gate 134, a "0" signal is outputted from the OR gate 134 and the contact member 123c of the switch 123 is connected to the fixed contact 123a. The interlacing mode driving circuit in the drive circuit 107 is operated and the device 102 is driven in the interlacing mode. In this case, accordingly, the interpolation by way of the lH delay line 120, adder 121 and switch 123 is not carried out.

When the temperature of the device 102 becomes high, the detection signal from the temperature sensor 109 exceeds the reference voltage value of the reference voltage source 111 of the comparator 112 and the "1" signal is inputted to the OR gate 134. A "1" signal outputted from the OR gate 134 is inputted to the switch 123 and drive circuit 107. The contact member 123c of the switch 123 is connected to the fixed contact 123b and the non-interlacing mode driving circuit in the drive circuit 107 is operated and the device 102 is driven in the non-interlacing mode. The operation for correcting the deterioration of the picture quality due to the increase in the dark current when the device 102 becomes a high temperature is substantially the same as that explained in the second member.

Next, in the gain-up mode, the contact member 132c of the gain-up switch 132 is connected to the fixed contact 132a and the voltage of the power source 132d is applied to the processing circuits 104 and 105, thereby respectively increasing the gains. In addition, the "1" signal is inputted to the AND gate 133. Therefore, when the detection signal level of the temperature sensor 109 does not exceed the reference voltage value of the voltage source 131 of the comparator 130, a zero signal is outputted from the comparator 130, so that the AND gate 133 and OR gate 134 output "0" signals. In response to these "0" signals, the contact member 123c of the switch 123 is connected to the fixed contact 123a and the interlacing mode driving circuit of the drive circuit 107 is operated, thereby driving the device 102 in the interlacing mode.

When the detection signal level of the sensor 109 increases and exceeds the reference voltage value of the reference voltage source 131 of the comparator 130, the "1" signal is outputted from the comparator 130 and the "1" signal is outputted from the AND gate 133, then the "1" signal is outputted from the OR gate 134. Thus, the contact member 123c of the switch 123 is connected to the fixed contact 123b and the non-interlacing mode driving circuit in the drive circuit 107 is operated, thereby driving the device 102 in the non-interlacing mode. Consequently, an increase in level of the noise generated due to the gain-up when an object of a low illuminance is photographed can be suppressed by reducing the generation of the dark current by driving the device 102 in the non-interlacing mode. At the same time, the flickering of the image upon driving in the non-interlacing mode can be prevented by the interpolation correcting means constituted by the interpolation switch 123, field change-over switch 122, adder 121, and 1H delay line 120. On one hand, even in the case where the gain-up is not performed, when the temperature of the device 102 further rises and the detection signal level of the temperature sensor 109 exceeds the reference voltage value of the voltage source 111 of the comparator 112, the "1" signal is outputted from the comparator 112 and inputted to the OR gate 134. The OR gate 134 outputs the "1" signal and the contact member 123c of the switch 123 is connected to the fixed contact 123b. The non-interlacing mode driving circuit of the drive circuit 107 is operated, thereby driving the device 102 in the non-interlacing mode. Thus, in a manner similar to the second embodiment, the degradation of the picture quality due to the increase in the dark current when the temperature of the device 102 is high can be prevented by driving the device 102 in the non-interlacing mode in which the dark current is little. Also, the flickering of the image which is caused due to the driving of the device 102 in the non-interlacing mode can be corrected by the interpolation correcting means.

The following table shows the relations among the interlacing mode and the non-interlacing mode which are executed in the normal mode and in the gain-up mode, and the temperature of the solid-state image pickup device.

TABLE

|  | Normal | Gain-up |
| --- | --- | --- |
| $T_{CCD} < T_0$ | Interlace | Interlace |
| $T_0 < T_{CCD} < T_1$ | Interlace | Non-interlace |
| $T_1 < T_{CCD}$ | Non-interlace | Non-interlace |

In this table, reference characters $T_{CCD}$ denotes the temperature of the solid-state image pickup device, $T_0$ is the temperature which is determined by the reference voltage source 131, and $T_1$ is the temperature which is decided by the reference voltage source 111. It will be appreciated from the table that the optimum mode is always automatically selected in any case in accordance with the temperature condition of the solid-state image pickup device and the normal mode or gain-up mode.

Figure 1:
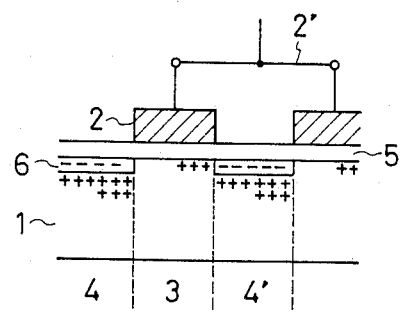
Figure 2:
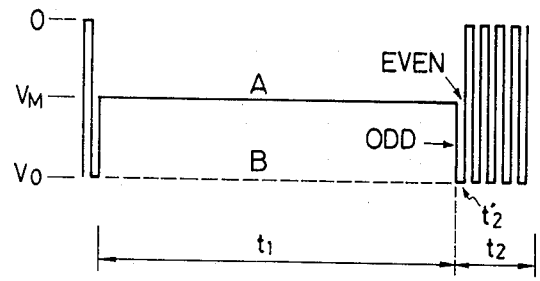

Description has been made in the above with regard to the case where the interpolation correcting means for correcting the flickering of the image upon driving in the non-interlacing mode is provided in the apparatus of the third embodiment. However, in the case where no consideration is made for the flickering of the image which is generated upon driving in the non-interlacing mode of the solid-state image pickup device which is executed when the solid-state image pickup apparatus is operated in the normal mode or gain-up mode, the above-mentioned interpolation correcting means and the like are unnecessary. In this case, it is necessary to constitute the apparatus in a manner such that the output of the OR gate 134 is inputted to the drive circuit 107 and the output signal of the luminance signal processing circuit 104 is directly inputted to the encoder 106 as shown in FIG. 1. Practically speaking, the lH delay line 120, adder 121, field change-over switch 122, and interpolation switch 123 are omitted. The arrangement in which the odd field and even field signals outputted from the clock circuit are inputted and the arrangement in which the signal is inputted from the OR gate 134 to the interpolation switch 123 become unnecessary.

Although the case where the increase in the dark current of the solid-state image pickup device is detected by the temperature sensor has been described in the first to third embodiment, it can be also detected by way of the sampling of the output, e.g., optical black of the solid-state image pickup device. The increase in the dark current of the solid-state image pickup device can be also detected by measuring the accumulating period. In such a case, the driving of the device may be changed from the interlacing mode to the non-interlacing mode when the accumulating period is longer than the predetermined value.

On one hand, although the driving of the solid-state image pickup device is discontinuously switched from the interlacing mode to the non-interlacing mode, it may be continuously changed.

In addition, the case where the gain-up of the signal processing circuits is manually operated has been described in the third embodiment. However, it is possible to detect whether an illuminance of an object is low or not by a light quantity detector attached externally and in the case of a low illuminance, the gain-up switch can be automatically turned on. Or, the video level in the automatic gain control circuit system is continuously detected and a variation of the video level is detected and the gain-up switch can be also automatically turned on.

It is obvious that the first to third embodiments of the invention are not limited to the solid-state image pickup device of a single substrate of the single-phase driving system but may be also applied to the frame transfer type CCD of the two-phase driving system or three-phase driving system, interline type CCD, MOS type image sensor, solid-state image pickup device of the two-substrate type, and solid-state image pickup device of the three-substrate type.

As described above, according to the first embodiment of the invention, the increase in the dark current of the solid-state image pickup device is detected by the first means and the states of the potential wells of the device are controlled on the basis of this detection signal. Therefore, the deterioration of the picture quality due to the increase in the dark current when the temperature of the solid-state image pickup device is high can be prevented and the image of a good picture quality can be formed. According to the second embodiment, in addition to the effect of the first embodiment, the flickering of the image when the resolution decreases can be prevented by the means for interpolating and correcting the output of the solid-state image pickup device and the image of a further good picture quality can be formed. Moreover, according to the third embodiment, in addition to the effect of the first embodiment, the deterioration of the picture quality can be prevented by controlling the states of the potential wells of the solid-state image pickup device in accordance with the increase in the level of the noise that is caused when an object of a low illuminance is photographed, so that the image of a good picture quality can be formed.

I claim:

1. A solid-state image pickup device comprising:
   (A) image sensing means having a plurality of pixels formed by potential wells;
   (B) means for controlling states of said image sensing means, said control means having a first mode for controlling said potential wells so that they are in a first state and a second mode for controlling said potential wells so that dark current which occurs in the potential wells is smaller than in the first mode;
   (C) detecting means for detecting an increase in the dark current of said sensing means; and
   (D) switching means for switching between said first and second modes of said control means in accordance with the result by detection of said detecting means.

2. A solid-state image pickup device according to claim 1, wherein said switching means switches from said first state to said second state when the dark current detected by said detecting means increases in excess of a predetermined value.

3. A solid-state image pickup device according to claim 1, wherein said detecting means comprises means for detecting a temperature corresponding to a temperature of said image sensing means.

4. A solid-state image pickup device according to claim 2, wherein said detecting means comprises means for detecting a temperature corresponding to a temperature of said image sensing means.

5. A device comprising:
   (A) accumulating means for accumulating a signal into a plurality of accumulating parts;

(B) control means for controlling states of said accumulating means, said control means having a first mode for controlling said accumulating parts so that they are in a first state and second mode for controlling said accumulating parts so that noise which occurs in the accumulating parts is smaller than that of the first mode;

(C) detecting means for detecting a condition in which an increase occurs in the noise of said accumulating means; and (D) switching means for switching between said first and second states in accordance with the result of the detection by said detecting means.

6. A device according to claim 5, wherein said device includes an image pickup device.

7. A device according to claim 6, wherein said accumulating parts include image sensing parts.

8. A device according to claim 5, wherein the variation of the noise generated in each of said accumulating parts is a dark current which is generated in each of the accumulating parts.

9. A device according to claim 7, wherein the variation of the noise generated in each of said accumulating parts is a dark current which is generated in each of the accumulating parts.

10. A device according to claim 8, wherein said accumulating parts of said accumulating means are constituted by potential wells and said first state is a state in which said potential wells have a first depth and said second state is a state in which said potential wells are shallower than said first depth.

11. A device according to claim 5, wherein said switching means sets said accumulating means to said second state when a condition such as to cause an increase in the noise is detected.

12. A device according to claim 9, wherein said accumulating parts of said accumulating means are constituted by potential wells and said first state is a state in which said potential wells have a first depth and said second state is a state in which said potential wells are shallower than said first depth.

13. A device according to claim 10, wherein said switching means sets said accumulating means to said second state when the condition such as to cause the increase in the noise is detected.

14. A solid-state image pickup device comprising:
(a) image sensing means for converting incident radiation into an electrical signal;
(b) control means for controlling said image sensing means, said control means driving said image sensing means in an interlacing mode or a non-interlacing mode;
(c) means for detecting that an increase of noise in said image sensing means cocurs; and
(d) means for causing said control means to change over the driving mode of said image sensing means between the interlacing mode and the non-interlacing mode according to a result of detection by said detecting means.

15. A device according to claim 14, wherein said image sensing means has a potential well.

16. A device according to claim 15, wherein said control means controls a state of said potential well to drive said image sensing means in the interlacing mode of the non-interlacing mode.

17. A device according to claim 16, wherein said detecting means includes a temperature detection means.

18. A device according to claim 14, wherein said change over means changes over the driving mode of said image sensing means from the interlacing mode to the non-interlacing mode when said detecting means detects the increase of noise.

19. A device according to claim 14, further comprising process means for processing the electrical signal converted by said image sensing means.

20. A device according to claim 19, wherein said process means includes interpolation means for interpolating the electrical signal when the driving mode of said control means is the non-interlacing mode.

21. A solid-state image pickup device comprising:
(a) image sensing means for converting incident radiation into an electrical signal;
(b) control means for controlling said image sensing means, said control means driving said image sensing means in an interlacing mode or a non-interlacing mode;
(c) means for amplifying the electrical signal at a given gain; and
(d) means for changing over the driving mode of said image sensing means between the interlacing mode and the non-interlacing mode according to the gain of said amplifying means.

22. A device according to claim 21, wherein said image sensing means has a potential well.

23. A device according to claim 22, wherein said control means controls a state of the potential well to drive said image sensing means in the interlacing mode or the non-interlacing mode.

24. A device according to claim 21 further comprising setting means for setting the gain of said amplifying means.

25. A device according to claim 21, wherein said change over means changes over the driving mode of said image sensing means from the interlacing mode to the non-noninterlacing mode when the gain becomes larger than a predetermined value.

26. A device according to claim 21 further comprising process means for processing the electrical signal converted by said image sensing means.

27. A device according to claim 26, wherein said process means includes interpolation means for interpolating the electrical signal when the driving mode of said control means is the non-interlacing mode.

* * * * *

UNITED STATES PATENT AND TRADEMARK OFFICE
CERTIFICATE OF CORRECTION

PATENT NO. : 4,760,453

DATED : July 26, 1988

INVENTOR(S) : Teruo Hieda

It is certified that error appears in the above-identified patent and that said Letters Patent is hereby corrected as shown below:

COLUMN 2

Line 4, "$K_2$ potential" should read --$K_2$ are potential--.
    Line 5, "constarts" should read --constants--.

COLUMN 3

Line 57, "$V_p$ example," should read --$V_p$ (for example,--.

COLUMN 4

Line 41, "welds" should read --wells--.

COLUMN 7

Line 4, "gammer" should read --gamma--.
    Line 28, "elecrrode 2" should read --electrode 2--.
    Line 32, "out them" should read --them out--.

COLUMN 12

Line 11, "member." should read --embodiment.--.

COLUMN 13

Line 65, "detecter" should read --detector--.

COLUMN 15

Line 4, "second mode" should read --a second mode--.
    Line 55, "cocurs;" should read --occurs;--.

UNITED STATES PATENT AND TRADEMARK OFFICE
CERTIFICATE OF CORRECTION

PATENT NO. : 4,760,453
DATED : July 26, 1988
INVENTOR(S) : Teruo Hieda

It is certified that error appears in the above-identified patent and that said Letters Patent is hereby corrected as shown below:

COLUMN 16

Line 8, "of" should read --or--.
Line 49, "non-noninterlacing" should read --non-interlacing--.

Signed and Sealed this

Third Day of January, 1989

Attest:

DONALD J. QUIGG

*Attesting Officer*            *Commissioner of Patents and Trademarks*